United States Patent [19]

Barto, Jr. et al.

[11] 4,364,529
[45] Dec. 21, 1982

[54] LEADER PIN

[75] Inventors: Robert M. Barto, Jr., Wyckoff, N.J.; Ira Lopata, New York, N.Y.; Bernard V. Emden, West Milford, N.J.

[73] Assignee: Ragen Precision Industries, Inc., North Arlington, N.J.

[21] Appl. No.: 233,966

[22] Filed: Feb. 12, 1981

[51] Int. Cl.³ .......................... G03B 1/04; G11B 15/32
[52] U.S. Cl. ...................................... 242/195; 226/92
[58] Field of Search .......................... 242/74, 195–200; 352/72, 73, 157, 235; 360/93–96, 132; 16/114 R; 24/265 R, 265 EC, 216, 217 R; 226/91, 92

[56] References Cited

U.S. PATENT DOCUMENTS

| 1,322,966 | 11/1919 | Sinclair | 206/400 |
| 1,649,470 | 11/1927 | Hayden | 242/74 |
| 1,977,103 | 10/1934 | Wise | 242/60 |
| 3,069,962 | 12/1962 | Rapata | 24/216 X |
| 3,188,091 | 6/1965 | Goodell | 242/195 |
| 3,594,832 | 7/1971 | Castagna | 360/95 |
| 4,027,832 | 6/1977 | Lopata | 242/197 |

Primary Examiner—Leonard D. Christian
Attorney, Agent, or Firm—Daniel H. Bobis

[57] ABSTRACT

A leader pin to securely hold the leading end of a strip for high speed unwinding wherein the end of a strip is inserted in a slot in a body and a keeper is inserted in the body embraced by the end of the strip; the keeper is provided with a resilient latch that is engageable with a channel on the body whereby the body and the keeper are strongly engaged together.

4 Claims, 3 Drawing Figures

LEADER PIN

BACKGROUND OF THE INVENTION

Field of Invention

This invention relates generally to leader pins for attachment to the end of a strip and particularly to such a leader pin which is provided with a keeper with a resilient latch and a body with an external channel for engagement with the resilient latch.

RELATED APPLICATIONS

This invention constitutes an improvement in the leader pin of U.S. Pat. No. 4,027,832 issued June 7, 1977 wherein the body and the keeper disclosed therein are provided with affirmative locking means to hold them together.

Prior Art

In various types of information retrieval systems, information is recorded on strips and the strips are unspooled until the desired section thereof is exposed for inspection or is capable of being revealed. Since the unspooling of the strip, whether it be film, tape or other material, is undertaken at high speed, a leader pin attached to the end of the film is required which firmly seizes the end of the film so that it is not subject to detachment nor does the leader pin exert great stress upon the end of the film so that it may easily tear or be broken. Such leader pins usually engage the end of a strip by friction or are required to be cemented thereto. The application of cement may be difficult or messy and is usually time consuming. The use of a leader pin which engages the strip solely by friction may result in slippage and discharge of the film from the leader pin. Furthermore, with repeated usage, the leader pin may come apart and thus the strip may become damaged and has to be rewound.

SUMMARY OF THE INVENTION

It has been found that a leader pin can be devised which is so constructed as to firmly frictionally engage a film therein against migration from a chosen seat and is further provided with a keeper having a latch thereon which engages the keeper strongly as a latch, with an external annular channel so that both keeper and body are held together against disengagement. The positioning of the film is accomplished by a constricted area wherein the film is confined between the keeper and the body and the affirmative engagement of the keeper with the body is provided for by a lip on the keeper which is disposed in registration with an annular channel on the body when the two members are engaged together. By this device, high speed, unspooling and respooling of a strip is accomplished with the strip positively positioned in the leader pin and the keeper is latched to the body.

DRAWINGS

These objects and advantages as well as other objects and advantages may be attained by the device illustrated in the drawings in which.

PREFERRED EMBODIMENT

Figure 1:
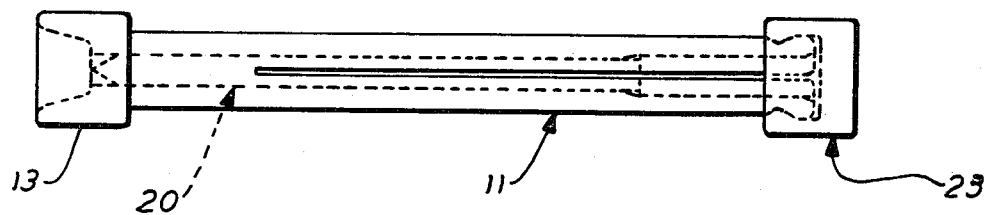
FIG. 1 is a side elevational view of the assembly of keeper and body.
Figure 2:
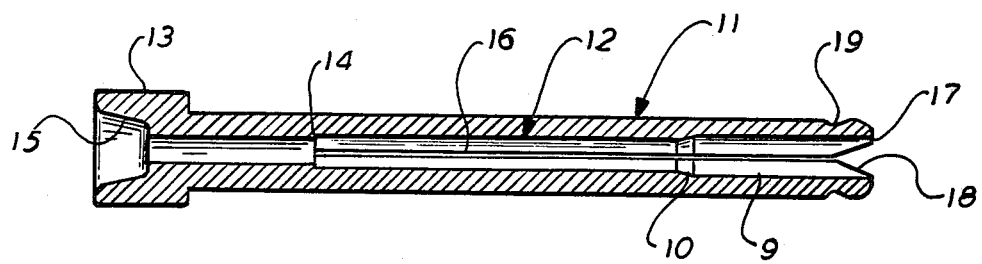
FIG. 2 is a side elevational view of the body disengaged from the keeper.
Figure 3:
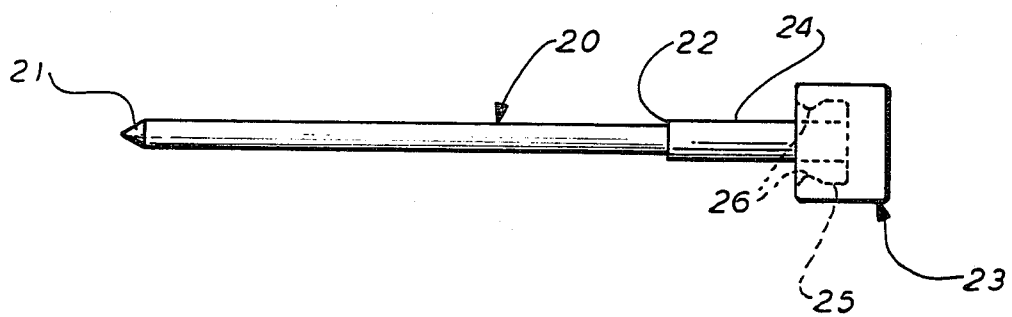
FIG. 3 is a side elevational view of the keeper disengaged from the body.

Referring now to the drawings in detail, the leader pin comprises a rod-shaped body 11 having a generally circular cross-sectional area. There is an axial passage 12 through the body from one end to the other. At one end of the body 11, there is an integral generally circular knob 13 on the body 11. The axial passage 12 at one end is provided with a shoulder 14 defining a constricted end portion which extends into the circular knob 13 on the body 11. In the knob 13, there is an outwardly flared end 15 on the axial passage 12. At the other end of the axial passage 12, there is an outwardly flared portion 10. There is also a radially enlarged end portion 9 on the axial passage 12 extending from the flared portion 10 to the end of the body. A longitudinal film slot 16 in the body 11 commences at the other end 17 thereof and extends toward the shoulder 14 in the axial passage 12. The slot 16 has a widened entry 18 to provide for the easy insertion of a strip into the slot 16. Externally on the body 11, there is an annular external channel 19 adjacent to the widened entry 18 and this external channel defines a seat for a latch on a keeper as will hereinafter be seen.

A rod-shaped keeper 20 is provided to engage the loop of a strip inserted into the longitudinal film slot 16 and keep it in place. A pointed tip 21 on the end of the keeper 20 ensures the passage of the end of the keeper 20 through the loop of the strip. A shoulder 22 on the keeper 20 defines a radially enlarged end portion 24. A knob 23 similar to the knob 13 is mounted at the end of the end portion 24. The knob 23 is provided with an internal annular socket 25 which surrounds the enlarged end portion 24 of the keeper 20 and this socket is dimensioned to receive the end 17 of the body 11 when the pointed tip 21 is inserted into the axial passage 12. At the entrance to the annular socket 25, a radial enlargement extending inwardly toward the rod-shaped body 11 is a deflectable resilient lip 26. This lip 26 being deflectable and resilient is engageable with the annular external channel 19 on the body 11 and constitutes a latch to fit into that channel 19 and to snap lock the body 11 into engagement with the keeper 20 when the keeper 20 is inserted into the axial passage 12. Thus the keeper 20 is affirmatively engaged with the rod-shaped body 11 to prevent axial disengagement. In use, a loop is formed in the end of a strip and the loop is inserted into the widened entry 18 of the slot 16 and moved into the axial passage 12 until it engages the shoulder 14. The shoulder 14 provides for normal seating of the strip and for centering it in the middle of the leader pin. Holding the knob 13 for convenience, the pointed tip 21 of the keeper 20 is inserted into the axial passage 12 in the body 11 and moved through the strip loop until it has reached its maximum insertion and the tapered shoulder is engaged by the enlarged end portion 24 of the keeper 20. As such engagement occurs, the end 17 of the body 11 has entered the annular socket 25 in the knob 23 of the keeper 20. As it does so, the resilient lip which is deflectable engages with the annular external channel 19 and affirmatively latches the keeper 20 with the body 11 by the lip 26 snap locking with the annular external channel 19 on the body 11. There is thus provided a relatively tight fit for the end of a strip in a leader pin so that the stress of rapid unspooling and respooling does not disengage a strip from the leader pin.

What is claimed is:

1. A leader pin comprising,
   a. an elongated body having an external surface and an internal wall spaced from said external surface to define an axially extending passage means in the body, and an opening at one end of the body in communication with the axially extending passage means
   b. said body having at least one axial slot extending from the end of the body having the opening and communicating between the external surface and the axially extending passage means to permit a loop of film to be inserted into the leader pin,
   c. said axial passage means shaped and sized to define spaced shoulders in the medial section of said elongated body, at least one of said shoulders being tapered,
   d. keeper means including, an elongated rod like section, and a knob assembly at one end of the rod like section,
   e. said rod like section shaped to be slidably insertable into the axial passage in the leader pin for operative association with said spaced shoulders and sized so that in assembled position the axial passage means and the keeper means will hold and center the loop of film between said spaced shoulders in assembled position,
   f. an annular locking channel formed on the body about the external surface thereof adjacent the open end,
   g. said knob assembly having a resilient deflectable latch engageable and disgageable with the annular locking channel on the body for affirmatively locking the body and the keeper means in assembled position.

2. In the leader pin as claimed in claim 1 wherein the resilient deflectable latch has the same internal and external dimensions in both the engaged and disengaged positions with the annular locking channel.

3. In the leader pin as claimed in claim 1 wherein the body has an enlarged portion of the same external dimensions as the knob of the keeper disposed at the end opposite the entrance to the axial passage mans such that the leader pin shall have a symmetrical configuration about its longitudinal axis.

4. A leader pin comprising
   (a) a rod-shaped body having a generally circular cross-sectional area,
   (b) an axial passage through the body,
   (c) a knob at one end of the body,
   (d) a slot in the body extending from one end toward the other,
   (e) a shoulder in the axial passage defining the end of the slot and an end portion of the axial passage having a narrower diameter than the axial passage,
   (f) at the opposite end of the axial passage, an outwardly flared portion,
   (g) beyond the outwardly flared portion of the axial passage, the axial passage having a diameter greater than the portion before the flared end,
   (h) a longitudinal film slot in the body extending from one end toward the knob,
   (i) a widened entry into the longitudinal film slot in the body at the end of the body to provide for the insertion of a loop of film into the slot,
   (j) an annular external channel on the body defining a seat for a latch,
   (k) a rod-shaped keeper dimensioned to fit into the axial passage in the body,
   (l) a pointed tip on one end of the keeper,
   (m) a shoulder defining a radially enlarged end portion of the keeper engageable with a film inserted in the slot to position it against the shoulder in the body,
   (n) a knob on the end portion of the keeper,
   (o) an annular internal socket in the knob in spaced relationship to the end portion of the keeper for receiving the end of the body,
   (p) a deflectable, resilient lip at the entrance to the annular socket in the knob,
   (q) the deflectable, resilient lip engageable with the annular external channel on the body whereby the deflectable, resilient lip and the annular external channel are in snap lock engagement with each other when the keeper is inserted into the axial passage.

* * * * *